(12) United States Patent
Legois et al.

(10) Patent No.: US 10,836,142 B2
(45) Date of Patent: Nov. 17, 2020

(54) LAMINATED GLAZING HAVING AN ELECTRICALLY CONDUCTIVE LAYER WITH AN ABLATION LINE, THE EDGES OF WHICH ARE FREE OF BEADS AND GENTLY SLOPED

(71) Applicant: SAINT-GOBAIN GLASS FRANCE, Courbevoie (FR)

(72) Inventors: Vincent Legois, Germigny des Pres (FR); Vincent Rachet, Saint-Cyr en Val (FR); Thomas Tondu, Sully (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/469,501

(22) PCT Filed: Dec. 12, 2017

(86) PCT No.: PCT/FR2017/053522
§ 371 (c)(1),
(2) Date: Jun. 13, 2019

(87) PCT Pub. No.: WO2018/109364
PCT Pub. Date: Jun. 21, 2018

(65) Prior Publication Data
US 2019/0381767 A1    Dec. 19, 2019

(30) Foreign Application Priority Data
Dec. 14, 2016    (FR) ...................... 16 62422

(51) Int. Cl.
B32B 15/04    (2006.01)
B32B 17/06    (2006.01)
(Continued)

(52) U.S. Cl.
CPC .. *B32B 17/10183* (2013.01); *B32B 17/10018* (2013.01); *B32B 17/1022* (2013.01);
(Continued)

(58) Field of Classification Search
USPC .................. 428/426, 428, 432, 434, 688
See application file for complete search history.

(56) References Cited

U.S. PATENT DOCUMENTS 10,597,001 B2 * 3/2020 Kagaya .................. B60S 1/586
2008/0318011 A1 * 12/2008 Chaussade ........ B32B 17/10174
428/210
(Continued)

FOREIGN PATENT DOCUMENTS

EP    0 353 141 A1    1/1990
EP    0 893 938 A1    1/1999
(Continued)

OTHER PUBLICATIONS

International Search Report as issued in International Patent Application No. PCT/FR2017/053522, dated Feb. 28, 2018.
(Continued)

*Primary Examiner* — Lauren R Colgan
(74) *Attorney, Agent, or Firm* — Pillsbury Winthrop Shaw Pittman LLP

(57) ABSTRACT

A laminated glazing includes one or two plies of 0.5 to 12 mm thickness, and one or more structural plies of 3 to 20 mm thickness, wherein at least that face of at least one ply of 0.5 to 12 mm thickness which is oriented toward the one or more structural plies and/or at least one face of the latter includes an electrically conductive layer of thickness comprised between 2 and 1600 nm, except on at least one ablation line, the edges of this line having no hem, and their average slope being at most equal to 5%.

20 Claims, 3 Drawing Sheets

Figure 1:
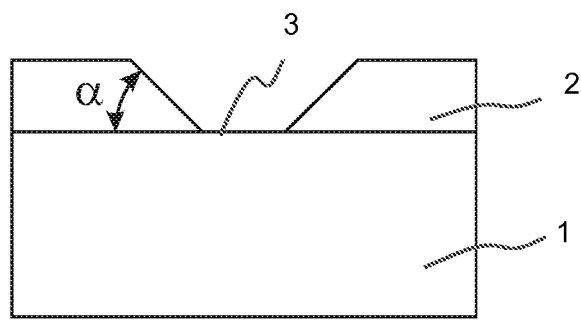

(51) Int. Cl.
 *B32B 17/10* (2006.01)
 *H05B 3/14* (2006.01)
 *H05B 3/84* (2006.01)

(52) U.S. Cl.
 CPC .... *B32B 17/1077* (2013.01); *B32B 17/10137* (2013.01); *B32B 17/10211* (2013.01); *B32B 17/10761* (2013.01); *B32B 17/10788* (2013.01); *H05B 3/141* (2013.01); *H05B 3/84* (2013.01); *B32B 2333/12* (2013.01); *B32B 2367/00* (2013.01); *B32B 2369/00* (2013.01); *H05B 2203/013* (2013.01); *H05B 2203/017* (2013.01)

(56) References Cited

U.S. PATENT DOCUMENTS

| | | | |
|---|---|---|---|
| 2010/0159251 | A1 | 6/2010 | Brandt |
| 2013/0082043 | A1* | 4/2013 | McCarthy ............... H05B 3/84 219/203 |
| 2015/0072084 | A1* | 3/2015 | Mimoun ........... B23K 26/0738 427/554 |
| 2015/0351160 | A1* | 12/2015 | Phan ...................... H05B 3/16 219/203 |
| 2016/0174295 | A1* | 6/2016 | Klein ...................... H05B 3/84 219/203 |
| 2018/0208293 | A1* | 7/2018 | Tondu ............... B32B 17/10174 |

FOREIGN PATENT DOCUMENTS

| | | |
|---|---|---|
| EP | 0 936 022 A2 | 8/1999 |
| EP | 2 591 638 A1 | 5/2013 |
| FR | 2 888 082 A1 | 1/2007 |
| WO | WO 2007/003849 A2 | 1/2007 |
| WO | WO 2010/080233 A1 | 7/2010 |
| WO | WO 2012/004280 A1 | 1/2012 |
| WO | WO 2017/001792 A1 | 1/2017 |

OTHER PUBLICATIONS

International Preliminary Report on Patentability and the Written Opinion of the International Searching Authority as issued in International Patent Application No. PCT/FR2017/053522, dated Jun. 18, 2019.

* cited by examiner

LAMINATED GLAZING HAVING AN ELECTRICALLY CONDUCTIVE LAYER WITH AN ABLATION LINE, THE EDGES OF WHICH ARE FREE OF BEADS AND GENTLY SLOPED

CROSS-REFERENCE TO RELATED APPLICATIONS

This application is the U.S. National Stage of PCT/FR2017/053522, filed Dec. 12, 2017, which in turn claims priority to French patent application number 1662422 filed Dec. 14, 2016. The content of these applications are incorporated herein by reference in their entireties.

The invention belongs to the field of heated glazings (anti-frost or anti-mist function) and in particular aeronautical (airplane and helicopter) heated glazings using a thin transparent conductive layer.

Heated aeronautical glazings are laminates of two or three (mineral) or organic glazing plies. The appearance of frost on aeronautical glazings may be prevented via joule heating by means of a thin transparent electrically conductive layer. For areas of nonrectangular shapes, the heated layer is deposited with sheet-resistance nonuniformities (function of the deposited thickness), also referred to as an Rsquare gradient, in order to limit the nonuniformity in the power density per unit area (it is only possible to heat rectangles uniformly). When the geometry of the heated area is complex, this gradient becomes very difficult to produce: the solution then consists in producing many flow lines (by means of a laser for example). This amounts to cutting the layer into multiple conductive strips of width smaller than 40 mm and separated by insulating lines (no layer) that are very narrow (between 40 microns and 250 microns). These closely spaced lines allow the current to be guided, the differences in power density in the interior of each strip to be limited and thus the entire area to be better heated (disappearance of cold zones).

Patent application US 2010/0159251 A1 describes ablation of flow lines respectively of 48 and 16 µm width in an electrically conductive layer by means of a YAG 355 nm laser. The ablation lines described in patent application US 2013/0082043 A1 have a thickness at most equal to 400 and preferably 50 µm.

Patent application WO 2007 003849 A2 describes the formation of heating layers by pyrolysis, magnetron cathode sputtering, etc., and the ablation, in such layers, of flow lines of 100 to 200 µm width and of phase-separation lines of 500 µm to 2 mm width (use of three-phase current) by means of a pulsed Nd-YAG 1064 nm laser.

However, the aesthetic appearance (visibility under certain observation conditions) of these ablation lines and the geometry of the ablation edges at the nanoscale scale have never been addressed.

Since the areas to be heated have been growing in size, the required number of flow lines has gradually increased. In addition, as the distance between the busbars has increased, the thickness of the deposited layer has also needed to increase and the lines have become increasingly visible. Under certain flight conditions, the presence of these lines may be a major distraction to airplane pilots.

The geometry of the edges of the ablation has a very marked influence on the visibility of the lines, in particular under night-time observation conditions (dark field) in the presence of bright point light sources.

Present day laser ablation techniques use nanosecond laser pulses the frequency, power and wavelength of which are variable from one machine to another. For thin transparent conductive layers deposited on glass, these layers do not allow "clean" ablations to be obtained: hems (additional thicknesses) of molten material, which in general have a height equal to the thickness of the deposit, remain on two edges of the lines, in a zone called the "thermally affected" zone.

These hems are visible under certain observation and lighting conditions and the greater their height, the greater their visibility.

The inventors have noted that the geometry of the ablation edges has a very marked influence on the mechanism of appearance of the flow lines and on the visual detection of these lines under the particular conditions described above.

These lines are visible in reflection when the observation distance is small (smaller than 500 mm) and when the layer is sufficiently thick (notable color change between the zone without layer and the zone with layer). At larger distances (>500 mm), they become invisible in reflection.

At small distances, in transmission and on a light field (blue sky for example), the thinner the layer, the more difficult it is to detect the flow lines, because the local variation in light transmittance is small. They become increasingly difficult to detect as distance increases.

However, in transmission and on a dark field, when the layer has a thickness larger than 150 nm, there are a few cases in which light can make these lines stand out quite clearly: bright point source+angle of incidence larger than 45° or bright diffuse light (for example a cloudy sky and observation of the lines from a dark background).

Thus, one subject of the invention is a laminated glazing comprising, from its first face, which is intended to be oriented toward the exterior atmosphere, to its second face, a first ply of 0.5 to 12 mm thickness, a first structural ply of 3 to 20 mm thickness, optionally one or more other structural plies of 3 to 20 mm thickness, and optionally a second ply of 0.5 to 12 mm thickness forming the second face of the glazing, at least that face of the first and/or second ply of 0.5 to 12 mm thickness which is oriented toward the one or more structural plies and/or at least one face of the latter comprising an electrically conductive layer of thickness comprised between 2 and 1600 nm, except on at least one ablation line, characterized in that the edges of this line have no hem, and in that their average slope is at most equal to 5%.

By modifying the geometry of the edges, by "structuring" them, the inventors have shown that it is possible to make the flow lines clearly more difficult to detect visually.

This structuring allows the hems present on the ablation edges to be removed but above all the slope of these edges to be modified. Average slope is an important parameter that makes it possible to differentiate between lines that are highly visible on a dark field and lines that are hardly visible. The average slope corresponds to the slope of the straight line connecting the surface of the glass (bottom of the ablation) and the surface of the layer. Its value in % is equal to 100×tan α (angle of the average slope of the edge with respect to the plane of the substrate). For average-slope values at most equal to 5%, the lines are very difficult to see. The higher this value, the more visible the lines. The important thing is to obtain a very gradual variation in the thickness of the layer on each side of the flow line.

The shape of the edges may be rectilinear or curved (circular, elliptical, parabolic, etc.).

A "simple" test to verify the effect of the structuring of the edges on the visibility of the lines consists in observing the ablated surface on a dark field while lighting it with a bright annular light source so that the light strikes this surface with an angle of incidence of 45° (or more).

An ablation line may here consist in an electrically insulating strip of 1 to 5 mm width that loops back on itself so as to delineate the periphery of a heating zone.

The structuring of the ablation edges allows:
the ablation lines to be made invisible (or less visible in the case of very thick layers) whatever the observation conditions;
the number of flow lines per unit area to be increased;
the uniformity of the heating to be increased; and
the electrical power required to defrost/demist glazings to be decreased.

According to preferred features of the laminated glazing of the invention:
the width of the ablation line(s) called the flow line(s) is comprised between 40 and 250 μm; the term "width" is here understood to mean that the bottom of the ablation;
the laminated glazing comprises a plurality of substantially parallel and equidistant flow lines, and the distance between two neighboring flow lines is at least equal to 8 mm, and at most equal to 40, and in increasing order of preference, 25 and 20 mm; this distance defines the width of the electrically conductive strips;
the width of the ablation line(s) called the phase-separation line(s) is comprised between 0.5 and 2 mm; when the heating layer of the glazing is powered with three phase current, there are two such phase-separation lines; despite the width thereof, their visibility is decreased by virtue of the measures of the invention, and sight thereof is much less distracting under the conditions of use, such as those of daytime or nighttime flights;
each ablation line cuts, substantially orthogonally, two current supply strips that are placed along two opposite sides of the glazing, and has a curvature and possibly an inflection when these two opposite sides make an angle therebetween or when the two ends of the ablation line do not face each other but are offset from each other; this geometry ensures the entire glazing is likely to be uniformly heated even when its area is of complex geometry i.e. of a geometry different from that of a rectangle; thus cold zones are avoided, such zones possibly being poorly defrosted or demisted or indeed not at all defrosted or demisted;
the average slope of the edges of the ablation line is at most equal to 2%;
the one or more plies of 0.5 to 12 mm thickness are made of chemically toughened glass;
the one or more structural plies are made of thermally semi-tempered or chemically toughened glass, or made of a polymer such as polymethyl methacrylate, polycarbonate or polyethylene terephthalate;
the electrically conductive layer consists in a layer of tin-doped indium oxide (ITO), of fluorine-doped tin oxide ($SnO_2$:F) or of aluminum-doped zinc oxide (AZO), or in a metal layer such as of gold or of silver;
the one or more plies of 0.5 to 12 mm thickness and the one or more structural plies are adhesively bonded pairwise via an adhesive interlayer that each consist, independently of the others, in a layer of polyvinyl butyral (PVB), polyurethane (PU) or poly(ethylene-vinyl acetate) (EVA) of 0.5 to 20 and preferably 1 to 16 mm thickness.

Another subject of the invention is a process for manufacturing a laminated glazing such as described above, characterized in that at least one ply of 0.5 to 12 mm thickness or at least one structural ply, one face of which comprises an electrically conductive layer of thickness comprised between 2 and 1600 nm, is subjected, on the side of the latter, to pulsed laser ablation with laser pulses of duration at most equal to 100, preferably 20 and particularly preferably 15 ps, and at least equal to 2 and preferably 5 ps.

The flow lines may be produced by laser ablation, with pico- or femto-second laser pulses. It is important that the laser be fired from the same side as the electrically conductive layer; specifically, if it were fired from the same side as that face of the ply which is opposite this layer, the ablation would be easy and the edges would be clean but of higher slope—of about 30° instead of 5° for example.

The laser ablation may be replaced by a chemical etch of the layer.

As will be seen in more detail below, it is possible to use a multistep ablation, the depth of the ablation and the width of the pattern varying (portions of the layer of increasingly small width being removed) in each step. This is advantageous way of increasing the structuring of the ablation edges, in particular in the case of thick layers (>800 nm), and/or of decreasing the angle of the edges of the ablation line and further decreasing the visibility thereof.

According to preferred features of the process of the invention:
the ablation is carried out at a rate of movement of the ply with respect to the laser of 10 to 600 and preferably 50 to 350 mm/s; the laser, or laser head which may be equipped with a scanner, may also be able to move with respect to the glass (or equivalent) ply, which may then remain stationary;
a scanner is associated with the laser so as to move the laser spot in order to produce a relatively wide ablation line, such as of 0.5 to 2 mm width; the laser is moved over the electrically conductive layer in a pattern (circle, diamond, etc.) defined by means of the scanner; the movement of this pattern itself engenders a continuous line of a width equal to that of the pattern.

Another subject of the invention is the use of a laminated glazing such as described above as a defrosting and/or demisting glazing employing an electrically conductive transparent layer, in an air transport vehicle, ground and in particular rail transport vehicle, water and in particular sea transport vehicle, and/or in an armored military or civil transport vehicle.

The invention will be better understood in light of the following example embodiment, given with reference to the appended schematic representations in which:

FIGS. 1 to 4 show various geometries of ablation-line edges and, for the first three of these figures, the average slope of these edges; and FIGS. 5 and 6 and 7 to 9 respectively illustrate a first and second embodiment of the process of the invention, respectively.

In each of the nine figures, a chemically toughened glass ply 1 of 3 mm thickness is equipped with a coating 2 of tin-doped indium oxide (ITO) of 300 nm thickness.

The coating 2 is removed by ablation in a line, the bottom 3 of the ablation having a width of 80 μm.

Figure 2:
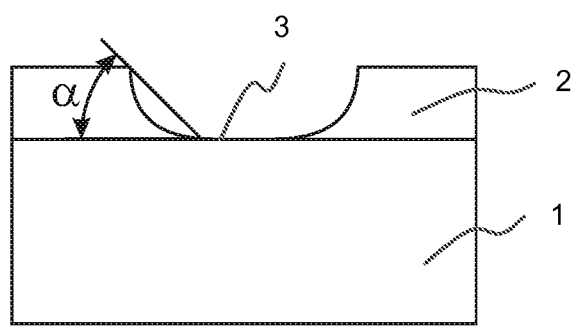
Figure 3:
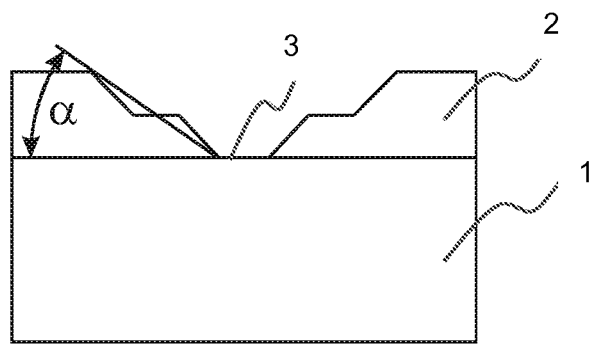

FIGS. 1 to 3 show the average slope of angle α that, according to the invention, must be at most equal to 5°

No edge of these ablation lines has a hem or additional thickness of height corresponding to the thickness of material melted by the ablation.

Figure 4:
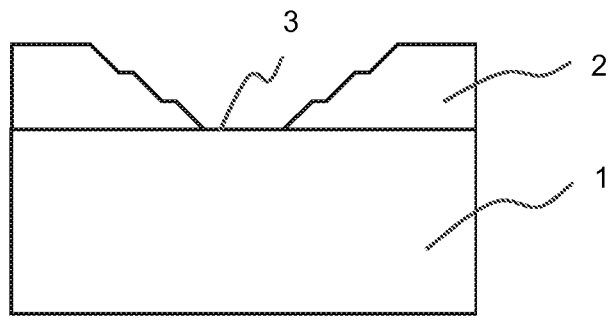

FIGS. 1, 3 and 4 show oblique rectilinear ablation edges, of single-terrace type in FIG. 3 and of double-terrace type in FIG. 4. FIG. 2 shows curved ablation edges.

Two processes are described here.

A laser sold by Trumpf under the reference TruMicro 5070 and with the following characteristics is used:
Wavelength 1030 nm
Average power 100 W
Frequency 400-600 kHz
Pulse energy lower than 250 µJ
Pulses shorter than 10 ps.

Figure 5:
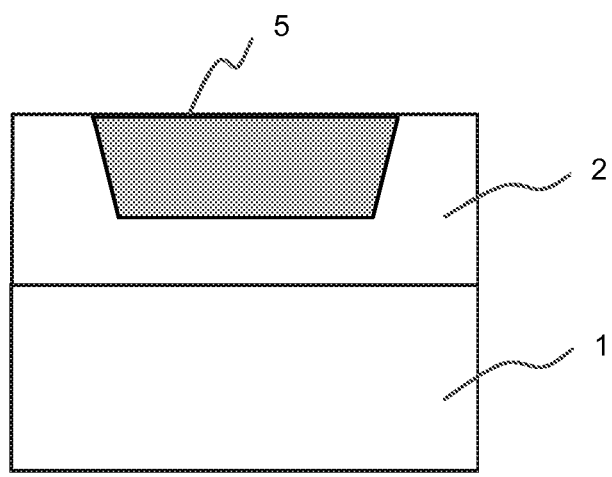
Figure 6:
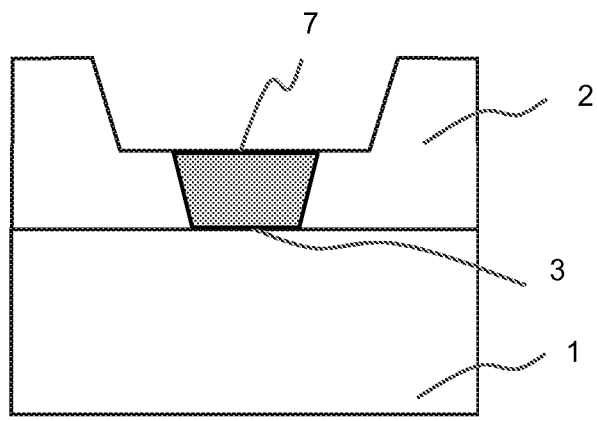

Two steps of a first process are shown in FIGS. 5 and 6.

In a first step (FIG. 5), partial ablation 5 is carried out along a line of 200-300 µm width to a depth of 150 nm.

For this first step, the parameters of the laser are set as follows:
Focal length 250 mm
Laser 50 kHz-energy/pulse 50 or 60 µJ to be adjusted
Circular pattern of 250 µm defined by a scanner
Scan speed 1250 mm/s
Stationary laser, speed of the ply 100 mm/s.

In a second step (FIG. 6), a complete second ablation 7 is carried out in a line, the bottom 3 of the ablation being of 80 µm width, as indicated above.

For this second step, the parameters of the laser are set as follows:
Focal length 250 mm
Laser 25 kHz-energy/pulse 120 µJ
No need for a scanner
Stationary laser, speed of the ply 150 mm/s.

Figure 7:
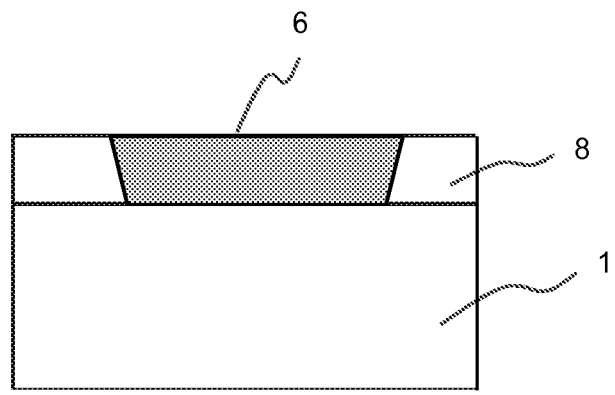
Figure 8:
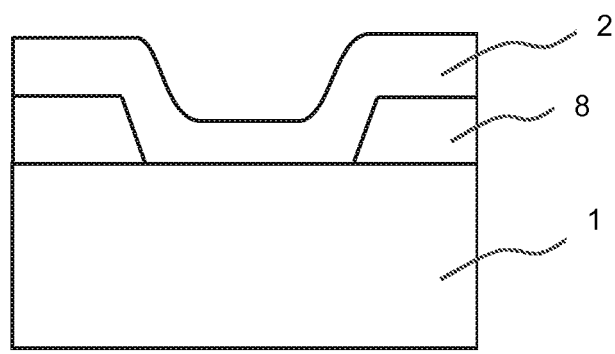
Figure 9:
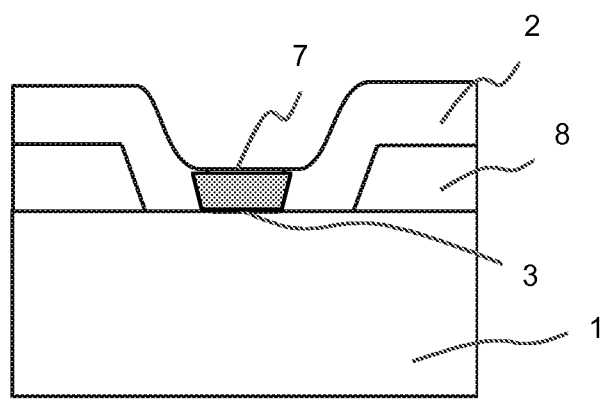

A second alternative process is shown in FIGS. 7, 8 and 9.

The ply 1 is here equipped from the very start with a layer 8 susceptible to being removed by laser ablation as described above. It may also be an ITO layer.

In a first step (FIG. 7), a complete ablation 6 of the layer 8 is carried out in a line.

In a second step (FIG. 8), an ITO layer 2 is formed on the surface of the product of the first step.

In the third and last step, a complete laser ablation 7 of the ITO layer 2 is carried out, the bottom 3 of the ablation being of 80 µm width.

The invention claimed is:

1. A laminated glazing having a first face and a second face, the laminated glazing comprising, from the first face, which is intended to be oriented toward the exterior atmosphere, to the second face, a first ply of 0.5 to 12 mm thickness, a first structural ply of 3 to 20 mm thickness, optionally one or more other structural plies of 3 to 20 mm thickness, and optionally a second ply of 0.5 to 12 mm thickness forming the second face of the glazing, at least a face of the first and/or second ply of 0.5 to 12 mm thickness which is oriented toward the one or more structural plies and/or at least one face of the latter comprising an electrically conductive layer of thickness comprised between 2 and 1600 nm, except on at least one ablation line, wherein edges of the ablation line have no hem, and wherein an average slope of the edges is at most equal to 5%.

2. The glazing as claimed in claim 1, wherein a width of the at least one ablation line, which forms a flow line, is comprised between 40 and 250 µm.

3. The glazing as claimed in claim 2, further comprising a plurality of substantially parallel and equidistant flow lines, and wherein a distance between two neighboring flow lines is at least equal to 8 mm, and at most equal to 40.

4. The glazing as claimed in claim 3, wherein the distance between two neighboring flow lines is in increasing order of 25 and 20 mm.

5. The glazing as claimed in claim 1, wherein a width of the at least one ablation line is comprised between 0.5 and 2 mm.

6. The glazing as claimed in claim 1, wherein each ablation line cuts, substantially orthogonally, two current supply strips that are placed along two opposite sides of the glazing, and has a curvature and possibly an inflection when the two opposite sides make an angle therebetween or when the two ends of the ablation line do not face each other but are offset from each other.

7. The glazing as claimed in claim 1, wherein the average slope of the edges of the ablation line is at most equal to 2%.

8. The glazing as claimed in claim 1, wherein the one or more plies of 0.5 to 12 mm thickness are made of chemically toughened glass.

9. The glazing as claimed in claim 1, wherein the one or more structural plies are made of thermally semi-tempered or chemically toughened glass, or made of a polymer.

10. The glazing as claimed in claim 9, wherein the polymer is a polymethyl methacrylate, polycarbonate or polyethylene terephthalate.

11. The glazing as claimed in claim 1, wherein the electrically conductive layer consists in a layer of tin-doped indium oxide, of fluorine-doped tin oxide or of aluminum-doped zinc oxide, or in a metal layer.

12. The glazing as claimed in claim 11, wherein the metal layer is a layer of gold or of silver.

13. The glazing as claimed in claim 1, wherein the one or more plies of 0.5 to 12 mm thickness and the one or more structural plies are adhesively bonded pairwise via an adhesive interlayer that each consist, independently of the others, in a layer of polyvinyl butyral, polyurethane or poly(ethylene-vinyl acetate) of 0.5 to 20 mm.

14. A process for manufacturing a laminated glazing as claimed in claim 1, wherein at least one ply of 0.5 to 12 mm thickness or at least one structural ply, one face of which comprises an electrically conductive layer of thickness comprised between 2 and 1600 nm, is subjected, on a side of the latter, to pulsed laser ablation with laser pulses of duration at most equal to 100 ps.

15. The process as claimed in claim 14, wherein the laser pulses have durations at most equal to 20 ps.

16. The process as claimed in claim 14, wherein the laser pulses have durations at most equal to 2 ps.

17. The process as claimed in claim 14, wherein the ablation is carried out at a rate of movement of the ply with respect to the laser of 10 to 600 mm/s.

18. The process as claimed in claim 14, wherein a scanner is associated with the laser so as to move the laser spot in order to produce a relatively wide ablation line.

19. The process as claimed in claim 18, wherein the ablation line has a 0.5 to 2 mm width.

20. A method comprising utilizing a laminated glazing as claimed in claim 1 as a defrosting and/or demisting glazing employing an electrically conductive transparent layer, in an air transport vehicle, ground and rail transport vehicle, water and sea transport vehicle, and/or in an armored military or civil transport vehicle.

* * * * *